US006994107B2

(12) United States Patent
Sosa

(10) Patent No.: US 6,994,107 B2
(45) Date of Patent: Feb. 7, 2006

(54) EASY-TO-INSTALL, MECHANICALLY-OPERATED AUTOMATIC/MANUAL DEVICE FOR CONTROLLING AN OUTLET FOR WATER OR ANY FLUID

(75) Inventor: Rafael H. T. Sosa, Guatemala (GT)

(73) Assignee: Ana Lidieth Madrigal Chavarria, San Jose (CR)

( * ) Notice: Subject to any disclaimer, the term of this patent is extended or adjusted under 35 U.S.C. 154(b) by 23 days.

(21) Appl. No.: 10/467,177

(22) PCT Filed: Feb. 15, 2002

(86) PCT No.: PCT/CR02/00003

§ 371 (c)(1),
(2), (4) Date: Aug. 15, 2003

(87) PCT Pub. No.: WO02/077505

PCT Pub. Date: Oct. 3, 2002

(65) Prior Publication Data

US 2004/0050424 A1 Mar. 18, 2004

(30) Foreign Application Priority Data

Feb. 16, 2001 (GT) .............................. PI-20010030

(51) Int. Cl.
*F16K 31/145* (2006.01)
(52) U.S. Cl. ..................... 137/389; 137/390; 137/454; 251/30.02
(58) Field of Classification Search ............... 137/389, 137/390, 386, 453, 454; 251/30.01, 30.02
See application file for complete search history.

(56) References Cited

U.S. PATENT DOCUMENTS

| | | | |
|---|---|---|---|
| 3,596,675 A | * | 8/1971 | Krueger et al. ............. 137/389 |
| 3,654,953 A | | 4/1972 | Hagdorn |
| 4,522,228 A | | 6/1985 | Campau |
| 4,554,830 A | | 11/1985 | Khoi |
| 4,566,484 A | | 1/1986 | Silverman |

FOREIGN PATENT DOCUMENTS

| | | |
|---|---|---|
| ES | 2149667 | 11/2000 |
| FR | 2595203 | 9/1987 |

* cited by examiner

*Primary Examiner*—Kevin Lee
(74) *Attorney, Agent, or Firm*—Dennison, Schultz, Dougherty & MacDonald

(57) ABSTRACT

This invention refers to an Automatic/Manual Device for Controlling Outflow of Water or any Fluid, with Mechanical Functioning and Easy Installation. It has a threadable intake nozzle for the inflow of water or any other fluid. The nozzle can be turned to direct the device as needed. Also, in the interior of the device there are two magnets with inverse polarity, a spring, two rubber membranes with orifices, a rubber membrane without an orifice, two supports for said membranes, an air chamber, a manually-activated metal ring, a functioning mechanism with the following positions: ON-OFF, a double copper tube that is submerged in the container to be filled, a rubber hose connecting the double copper tube with the air chamber, and an activating mechanism with "manual", and "automatic" positions for operating the device. The functioning of this invention is provided for, with the objective being to shut off the flow of water or any other fluid once the container, tank, trough, barrel, tub, bathtub, toilet, pool, or other reservoir has been filled, by way of hydrostatic pressure exerted by the water container itself through the double copper tube connected to the air chamber by way of the rubber hose, with the necessary pressure being exerted to separate the magnets and thus close the fluid flow orifice.

8 Claims, 3 Drawing Sheets

EASY-TO-INSTALL, MECHANICALLY-OPERATED AUTOMATIC/MANUAL DEVICE FOR CONTROLLING AN OUTLET FOR WATER OR ANY FLUID

OBJECTIVE AND DESCRIPTION OF THE INVENTION

The primary objective of the invention is to provide, to all users of potable water service supplied by the service provider company, a device that installs easily and allows use of the water system without having to be present while filling up containers, tanks, troughs, barrels, tubs, bathtubs, toilets, pools, and reservoirs in general, with the security that once the desired water level is reached the flow will be stopped, thus making unnecessary the presence of a person to start or stop the flow of water. A secondary objective of the invention is to provide a device that avoids wastage of water due to forgetfulness, by functioning totally and completely as a seal against any non-required passage of the vital liquid or once the container in question has been filled. A third and no less important objective of this invention is to provide to all homes and places where the water supply is scarce and only available for a few hours, most often at night, a low-cost device that allows people to not neglect their other activities or physiological needs, such as nighttime rest, in order to tend to the filling of containers necessary for their daily consumption and needs.

Previous Technique

There exist many simple fluid control systems that use relatively cheap components. One example of control by feedback is a drinking trough that uses a float to determine the water level. When the water level falls below a set point, the float drops, opens a valve, and allows more water into the trough. When the water level rises the float also rises, and upon reaching a certain point the valve is closed and the water flow is cut off. The disadvantage of this float flow valve is that the valve seat progressively gets worn down by the water pressure, and after a short time needs to be replaced. In the device represented by this invention there is no wearing down of the valve seat; it functions by totally opening or shutting off the flow of water of any other liquid. Another example is U.S. Pat. No. 4,094,327, which is a valve for toilet tanks. Said valve is supported inside the tank at the water inflow point as a vertical column. There exist simpler systems as well, which use a rod with a copper or plastic ball at the end that acts as a float. All such systems in many cases obstruct the functioning of the drain valve. This invention is installed outside the tank, and thus the drain valve remains inside the tank without obstructions. Another example is U.S. Pat. No. 4,566,484, in which the valve is submerged within the liquid. This invention is installed on the side of the tank to be filled. Another example is ES 2 096 539, which is a storage tank shutoff valve. Said control valve uses two tubes and more complex mechanisms. This invention is installed outside of the tank and uses only one tube, which conducts the fluid. Consequently, this invention substitutes for any complex mechanism used to substitute an electronic valve. An electronic valve is inadequate in some cases, such as where flammable fuels are present, or in the case of vessels or bathtubs were a person will be immersed in the water. An electronic valve is controlled by an electric or electronic water-level guard and electrodes that detect high or low water level. This invention has the functions and simple mechanisms of an electronic valve. In order to fulfill the aforementioned objectives and others, this invention is a device that can be easily installed at an outflow of water or any other liquid, with mechanical functioning that neither needs nor uses any source of electric or electronic energy, rechargeable or standard batteries, solar energy, nor any other power-source mechanism, in order to fill any kind of containers, tanks, troughs, barrels, tubs, bathtubs, toilets, pools, reservoirs, or similar vessels, either automatically or manually, including the ability to connect it to any garden hose or other type of hose.

BRIEF DESCRIPTION OF THE FIGURES

The aforementioned and other objectives of the advantages represented by this invention will be easily apparent by way of reference to the following detailed description, when considered together with the accompanying figures, wherein FIG. 1 is a layout and cross-sectional view of the:

FIG. 1 is a cross sectional view of an automatic/manual device for controlling outflow of a fluid;

Automatic/Manual Device for Controlling Outflow of Water or any Fluid, with Mechanical Functioning and Easy Installation. In this drawing the invention is shown at rest. Switch Q is in the ON (connected) position, indicating that the water or fluid is flowing from the INFLOW to the OUTFLOW of the device. Switch Q is activated by cylinder N. Selector P is in "automatic" position. Selector P has a metal ring 0 attached to it. Spring Ñ exerts pressure on round magnet M, placing it at the bottom of air chamber U, thus forcing small magnet K to remain in the upper inside part of cylinder Z, situated on the upper longitudinal shaft of the device. Cylinder Z houses piston J. Piston J houses small magnet K and a small rubber stopper I at its lower end. Small rubber stopper I is drawn away from hole H to free the water or fluid to flow through duct S, thereby releasing the pressure of the water or liquid in pressure chambers V and W. Rubber membranes D and F are activated by the passage of water or fluid. Rubber membranes D and F are separated from valve seats Y and X. The water coming from the device INFLOW arrives at pressure chamber W, where it splits in two directions. First, the majority of the water or fluid is discharged through the OUTFLOW duct of the device. Secondly, the water or fluid in pressure chamber W passes to pressure chamber V and is discharged through duct S and subsequently through the device OUTFLOW.

Figure 2:
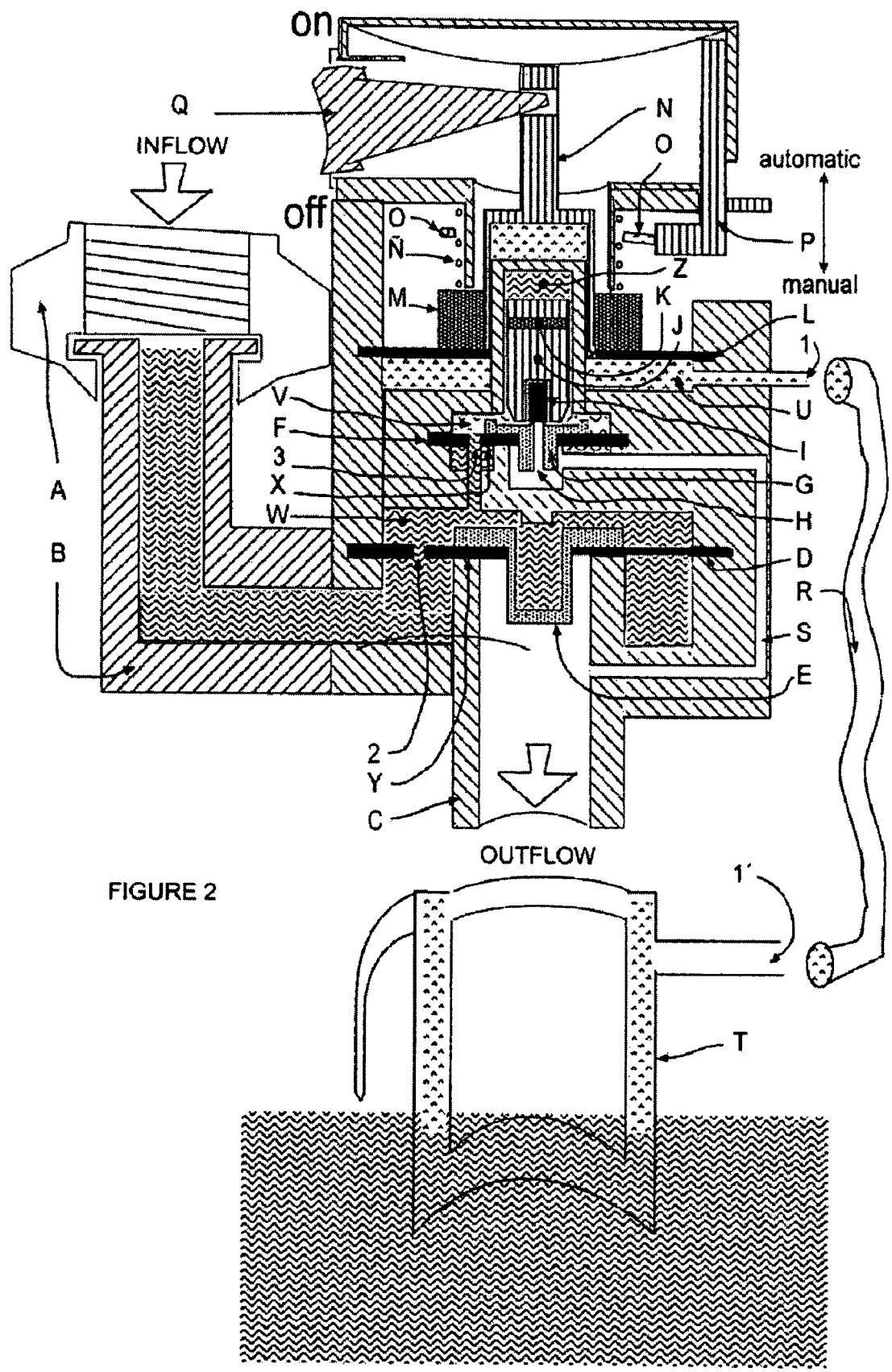
FIG. 2 is a cross sectional view of the automatic/manual device as shown in FIG. 1; and, FIG. 3 is a cross sectional view of a device for controlling outflow of water in accordance with the present invention.

FIG. 2 is a layout and cross-sectional view of the:

Automatic/Manual Device for Controlling Outflow of Water or any Fluid, with Mechanical Functioning and Easy Installation. In this drawing the invention is shown activated by the water or fluid level detected by the double tube T. Switch Q is in the OFF Position (function disconnected), indicating that the water or fluid is not circulating Switch Q is activated by cylinder N. Selector P is in "automatic" position. Spring Ñ is compressed when round magnet M rises. Round magnet M and cylinder N are raised by rubber membrane L, which is sensitive to hydrostatic pressure. Membrane L is raised by the hydrostatic pressure in air chamber U coming from double tube T. The hydrostatic pressure in double tube T is relayed through projection duct 1 and transmitted through rubber hose R to entrance duct 1 into air chamber U. When round magnet M rises it changes the position of small magnet K, moving it to the lower portion of cylinder Z, situated on the upper longitudinal shaft of the device. Cylinder Z houses piston J. Piston J houses small magnet K and a small rubber stopper I at its lower end. Small rubber stopper I is plugging hole H. With hole H plugged, the water or fluid does not flow through duct S. In pressure chambers V and W the water or fluid pressure becomes equal to the INFLOW pressure, thus exerting pressure on membranes D and F. Membranes D and F shut off the flow of water or fluid at valve seats X and Y, thus automatically shutting off the flow of water or liquid once the container or reservoir in question is full. In order to obtain water or liquid without removing the device, switch Q can be operated manually by holding it in the ON position. When released, switch Q returns automatically to the OFF position due to the water or fluid level detected by double tube T (see FIG. 2).

Figure 1:
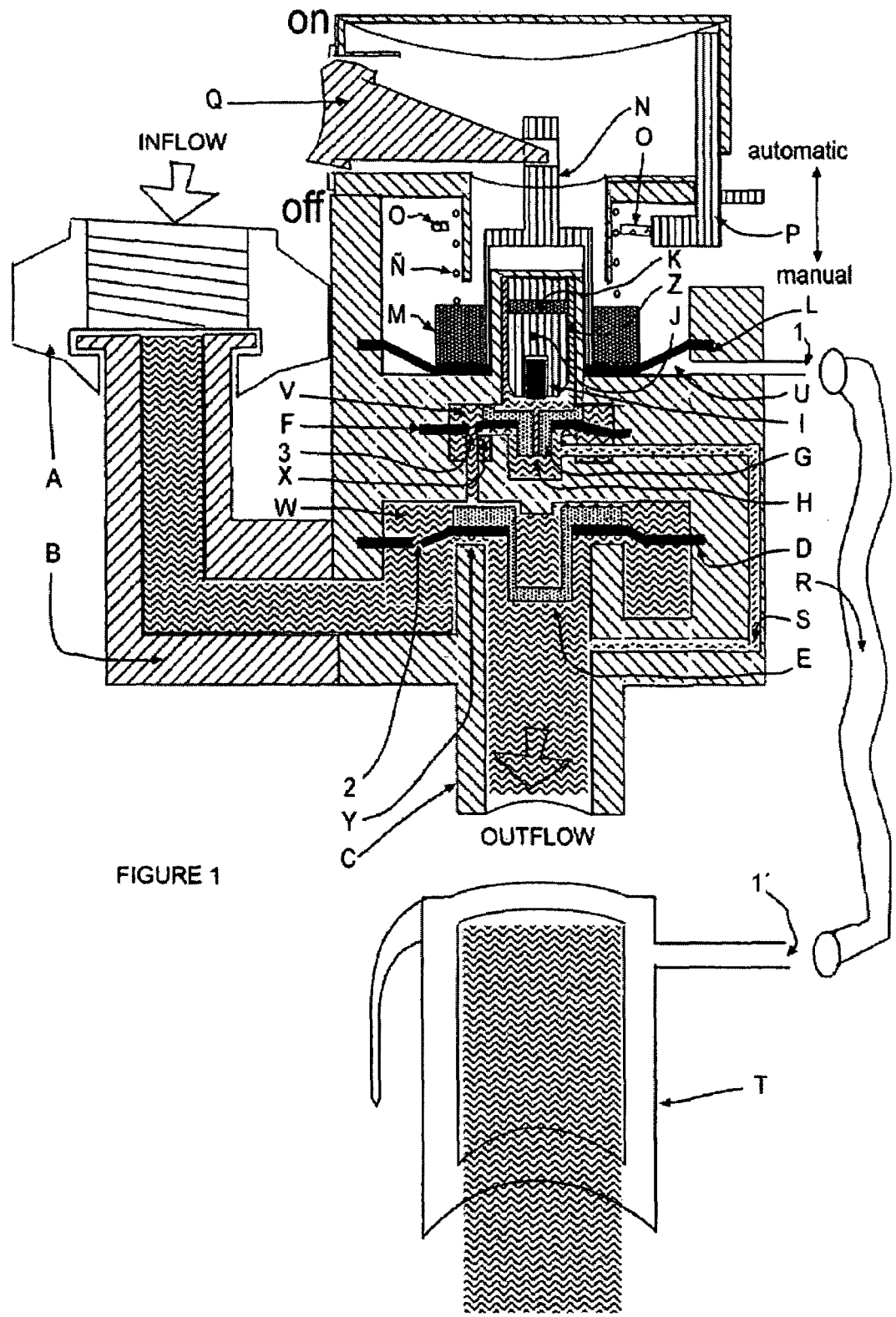
Figure 3:
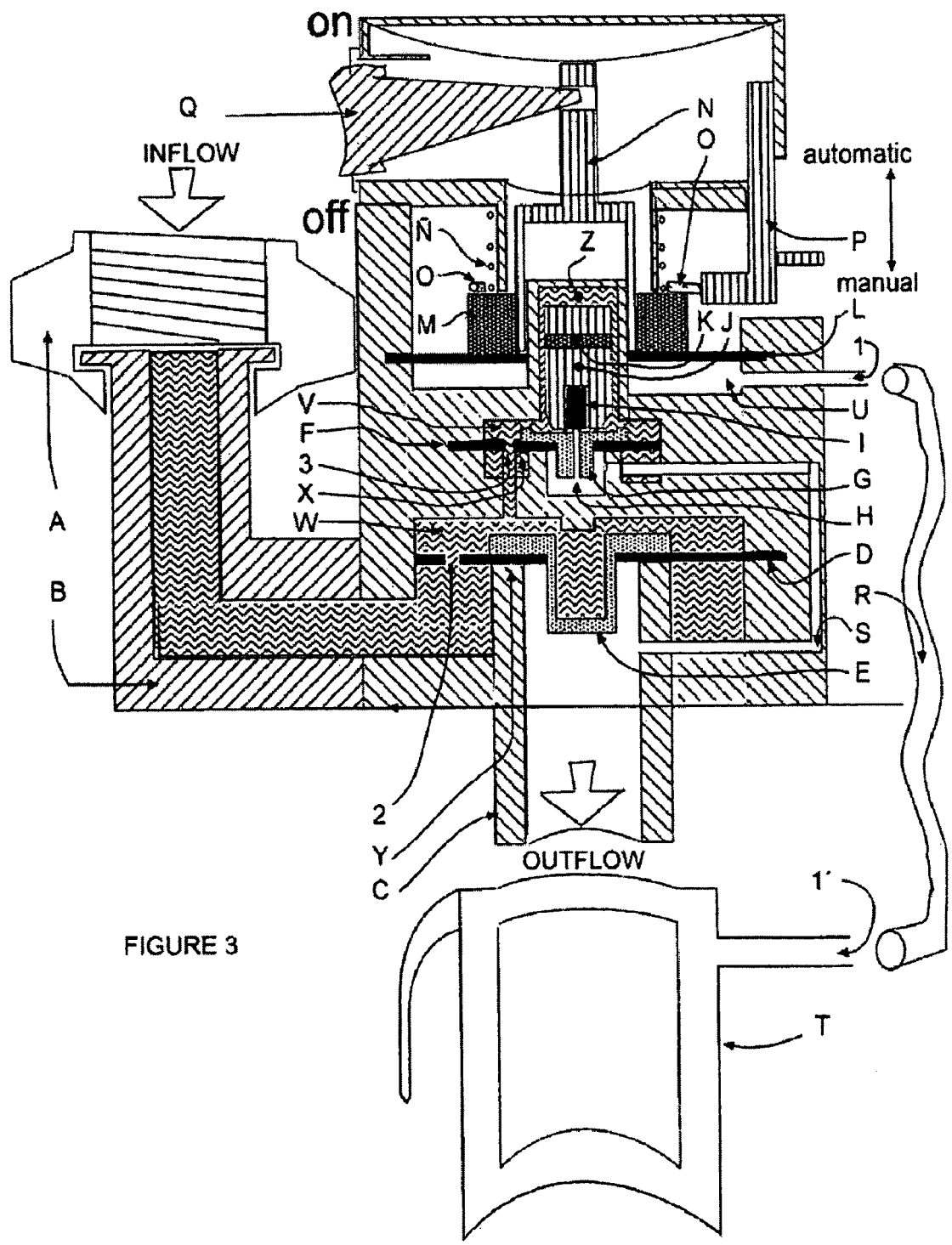

FIG. 3 is a layout and cross-sectional view of the:

Automatic/Manual Device for Controlling Outflow of Water or any Fluid, with Mechanical Functioning and Easy Installation. In this drawing the invention is shown activated as in FIG. 2, with the following variations: 1) Switch P is in the "manual" position. 2) No water or fluid level is present in double tube T, and thus no hydrostatic pressure exists. 3) Metal ring O is held to round magnet M by magnetic force. With the aforementioned variations, switch Q can be operated manually to activate or deactivate the device. If switch Q is operated manually and left in the ON position (connected), as shown in FIG. 1, the device is activated by the water or fluid level detected by double tube T (see FIG. 2). The device can operate at between 0.01 and 200 psi.

DETAILED DESCRIPTION OF THE PREFERRED FEATURES

The Automatic/Manual Device for Controlling Outflow of Water or any Fluid, with Mechanical Functioning and Easy Installation, is comprised of the part A dedicated to the admission or inflow of the water or other fluid, as can be noted in FIG. 1, where A is the stream inflow with a threadable end and arm B, which can be pointed in whatever direction is desired, attached to the device housing C. Duct B for the passage of water or other fluid leads to pressure chamber W, which houses the first rubber membrane D, which has a small diametric orifice 2. Its lateral portion communicates with pressure chamber V and cylinder Z. Pressure chamber V houses the second rubber membrane F, which has a small diametric orifice 3. The second rubber membrane F is supported by part G, which in turn has a small orifice H. Cylinder Z houses piston J. Piston J houses small magnet K and rubber stopper I, with rubber stopper I being situated at its external lower end, for purposes of plugging the small millimetric hole H located on the longitudinal shaft that allows the flow of water or fluid toward duct S. A third rubber membrane L can also be noted, which serves as support for cylindrical magnet M and cylinder N. Cylinder N has a projection which communicates with controller Q with the following positions: ON or OFF, as required. Moving up in FIG. 1, spring Ñ can be seen, along with the metal ring 0 attached to the arm of selector P, for the "manual" or "automatic" positions. Rubber tube R can also be seen, joining ducts 1 and 1' in order to exert the hydrostatic pressure necessary to cause movement of magnets M and K, and thus to observe the objectives set forth in this invention. Also in FIG. 1 can be seen double tube T, both tubes of which can be copper, or only partially (internally or externally) with the other part being of plastic material (polymer or PVC). A hook used to hang the device on the container to be filled can also be seen. Besides orifice 1' for connecting rubber hose R, the double tube T also has in its upper portion a smooth hole to enable it to be attached or connected to the same exit orifice of the device, thereby allowing the device to be more functional in containers with a small opening or access, and it needs no greater hydrostatic pressure in order to function with its completely mechanical mechanism, and needs no energy source such as batteries (standard or rechargeable), solar cells, electricity, electronic parts or connections, or similar items.

The operation of a device in accordance with the present invention controls the flow of fluid such as water or other liquid from an inlet to an outlet. For example, the device includes a housing C, member A including a threaded orifice for emission of water into the device. The device also includes an arm or L-shaped duct B operably connected to the housing C for channeling the flow of water to a first pressure chamber W. A first rubber membrane D having a small diameter orifice 2 is disposed between the L-shaped duct and the first pressure chamber W. A valve seat Y and part E support the membrane D and form a seal against the valve seat Y. The membrane D is activated by the flow of water when the device is connected to a source of water and a container for receiving a flow of water.

The device also includes a second pressure chamber V, a cylinder Z and a duct with an orifice 3 which connects the second pressure chamber V and cylinder Z to the first pressure chamber W. A duct S and a second rubber membrane F having a small diameter orifice (3) are constructed and arranged with a valve seat X and second part G which supports the second rubber membrane F and forms a secured sealed between the second rubber membrane F and a valve seat X. Further, the second part G has a small orifice H that allows water to flow through the duct S.

A circular magnet M surrounds the cylinder Z which houses a piston J and a small magnet K disposed on the piston J. The piston J is disposed in sliding contact within the cylinder Z and carries a small rubber part I disposed in a lower portion thereof.

A small magnet K is also disposed in the piston J in an upper portion thereof located inside the circular magnet M and the magnets are adapted to repel one another when a circular magnet M moves up or down, while the magnetic field of the small magnet K is moved down or up thus causing the rubber part I to open or close orifice H.

The device also includes an air chamber U and a third rubber membrane L that is sensitive to hydrostatic pressure and is disposed above the air chamber U and supports the circular magnet M and a cylindrical projection N. A spring Ñ exerts pressure on the circular magnet M moving it to the bottom of the air chamber U. The device also includes an on-off switch Q operably connected to the projection N for opening and closing the switch Q in response to hydrostatic pressure in the air chamber U.

A double tube T and hook position the device in a container for receiving water and a hose R operably connects the double tube T to the chamber U for moving the membrane L to open and close the switch Q.

What is claimed is:

1. A device for controlling the output of a fluid from an inflow to an outflow, said device comprising a housing (C), a member (A) including a threaded orifice for emission of a fluid flow, and an L-shaped duct (B) operatively connected to said housing (C), said device also includes a first pressure chamber (W) and a first rubber membrane (D) having a small diameter orifice (2) disposed between said L-shaped duct (B) and said first pressure chamber (W), a valve seat (Y) and a part (E) supporting said membrane (D) and forming a secure seal against said valve seat (Y), said membrane (D) and part (E) being activated by the flow of fluid from an inflow to an outflow when said device is connected to a container for filling the container; said device further including a second pressure chamber (V), a cylinder (Z) and a duct switch with a small diameter orifice (3) connecting said second pressure chamber (V), cylinder (Z) to said first pressure chamber (W), a duct (S), and a second rubber membrane (F) having a small diameter orifice (3) housed in said second pressure chamber (V), and a valve seat (X) and a second part (G) supporting said second rubber membrane (F) and forming a secure seal between said rubber membrane (F) and said valve seat (X) and said second part (G) having a small diameter orifice (H) that allows fluid to flow through said duct (S), and a circular magnet (M) surrounding said cylinder (Z); a small magnet (K), a small rubber part (I) and a piston (J) with said piston (J) disposed in sliding engagement in the inner part of said cylinder (Z) with said small rubber part (I) disposed in a lower portion of said piston (J) and said small magnet (K) is also disposed in the piston (J) in an upper portion thereof located inside the circular magnet (M) and are adapted to repel one another when the circular magnet (M) moves up or down, while the magnetic field of the small magnet (K) is moved down or up causing the rubber part (I) to open or close orifice (H); an air chamber (U) and a third rubber membrane (L) sensitive to hydrostatic pressure is disposed above said air chamber (U) support said circular magnet (M) and a cylindrical projection (N), a spring (Ñ) exerts pressure on circular magnet (M) moving it to the bottom of the chamber (U) and an on/off switch (Q) operatively connected to said projection (N) for opening and closing said switch (Q) in response to hydrostatic pressure in said air chamber (U); and a double tube (T) and a hook for positioning said double tube (T) in a container and a rubber tube (R) operably connects the double tube (T) to the chamber (U) for moving the membrane (L) to open and close the switch (Q).

2. A device for controlling the output of a fluid from an inflow to an outflow according to claim 1, which includes means for selecting automatic or mechanical operation of said device.

3. A device for controlling the output of a fluid from an inflow to an outflow according to claim 1, which includes a radially extending leak-proof thread on member (A).

4. A device for controlling the output of a fluid from an inflow to an outflow according to claim 1, which includes means for axially revolving said L-shaped duct (B).

5. A device for controlling the output of a fluid from an inflow to an outflow according to claim 1, in which said small magnet (K) is located inside the circular magnet (M) and adapted to repel one another when the circular magnet (M) moves up or down while the magnet field of the small magnet (K) is moved down or up and perform the function of a coil in an electric valve.

6. A device for controlling the output of a fluid from an inflow to an outflow according to claim 1, in which the device can operate at between 0.01 and 200 psi.

7. A device for controlling the out put of a fluid from an in flow to an out flow according to claim 1 in which the container is a toilet.

8. A device for controlling the output of a fluid from an in flow to an out flow according to claim 1 in which said container is a bathtub.

\* \* \* \* \*